United States Patent
Porcs et al.

(10) Patent No.: US 9,193,322 B2
(45) Date of Patent: Nov. 24, 2015

(54) GLOVE COMPARTMENT BOX WITH TEAR SEAM

(71) Applicant: Toyota Motor Engineering & Manufacturing North America, Inc., Erlanger, KY (US)

(72) Inventors: Robert A. Porcs, Saline, MI (US); Philip J. Babian, Canton, MI (US); Emily A. Khouphongsy, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/181,075

(22) Filed: Feb. 14, 2014

(65) Prior Publication Data
US 2015/0232036 A1    Aug. 20, 2015

(51) Int. Cl.
  *B60R 21/02* (2006.01)
  *B60R 7/06* (2006.01)
  *B60R 11/00* (2006.01)
  *B60R 21/00* (2006.01)

(52) U.S. Cl.
  CPC .  *B60R 21/02* (2013.01); *B60R 7/06* (2013.01); *B60R 2011/0005* (2013.01); *B60R 2021/0004* (2013.01)

(58) Field of Classification Search
  CPC .............. B60N 2/56; B06R 7/04; B06R 7/06; B06R 21/02; B06R 21/0286; B06R 21/04; B06R 21/045; B06R 2011/0005; B06R 2021/0004; B06R 2021/0251; B06R 2021/024
  USPC ............... 296/24.34, 37.8, 37.12, 70, 187.05; 224/483
  See application file for complete search history.

(56) References Cited

U.S. PATENT DOCUMENTS

| | | | | |
|---|---|---|---|---|
| 5,431,442 | A * | 7/1995 | Tomita et al. | 280/752 |
| 5,882,037 | A * | 3/1999 | Bauer et al. | 280/748 |
| 6,971,667 | B2 | 12/2005 | Enders et al. | |
| 7,213,840 | B2 | 5/2007 | Kumagai | |
| 8,205,909 | B2 | 6/2012 | Kalisz | |
| 8,491,037 | B2 * | 7/2013 | Sheng et al. | 296/187.05 |
| 8,579,325 | B2 | 11/2013 | Roychoudhury | |
| 2007/0267857 | A1 * | 11/2007 | Jonsson | 280/752 |
| 2013/0161977 | A1 | 6/2013 | Monnier | |

FOREIGN PATENT DOCUMENTS

DE    102009025606 A1 *   1/2010

OTHER PUBLICATIONS

English translation of De 10 2009 025 606; retreived from Espacenet Patenttranslate on Mar. 25, 2015.*

* cited by examiner

*Primary Examiner* — Jason S Daniels
(74) *Attorney, Agent, or Firm* — Dinsmore & Shohl LLP

(57) ABSTRACT

A glove compartment box energy having a tear seam on an inner wall is provided. The glove compartment box is mounted in an instrument panel of a vehicle. The tear seam is configured to allow a rearward moving structure from within the instrument panel such as a portion of the vehicle HVAC system to rupture the tear seam and enter an interior volume of the glove compartment box. The glove compartment box further has a frangible portion disposed on the inner wall. The frangible portion extends towards an interior of the instrument panel to concentrate stress on the tear seam. The tear seam and frangible portion prevent the rearward moving structure from displacing the glove compartment box rearward into a passenger compartment.

10 Claims, 5 Drawing Sheets

GLOVE COMPARTMENT BOX WITH TEAR SEAM

FIELD OF THE INVENTION

The present invention relates generally to a glove compartment box. More specifically, the invention relates to a glove compartment box having a tear seam.

BACKGROUND OF THE INVENTION

A glove compartment box or glove box is a compartment typically present as part of a dashboard or instrument panel in a vehicle. Glove boxes are typically located above the front-seat passenger's foot well and open into the passenger compartment. The glove box can be used for general storage of a number of different items such as gloves, the motor vehicle owner's manual, and miscellaneous items.

In a vehicle, components and structure located between the firewall and the passenger compartment are often concealed behind the instrument panel (IP). These components include portions of the HVAC, vehicle cross braces, and various electronic systems. As vehicles have become more complex, the amount of components and structure within the IP has increased such that there is little vacant space between the IP and the firewall.

In a front end collision, in which the firewall may be pushed rearwards towards the passenger compartment, these components and structure are also pushed rearwards into the passenger compartment where they may force the IP into contact with the occupants. In addition to airbags that protect occupants from impacting portions of the IP, it is well known for the surfaces of the IP to have energy absorbing capabilities. These energy absorbing surfaces break the load path between the occupant and the surface.

However, energy absorbing surfaces on the exterior of the IP do not prevent a rearward moving force from displacing the IP into the passenger compartment. Furthermore, when the firewall is deformed and there is engine push rearward towards the passenger compartment, the IP can become part of the system and transmit the combined forces rearwards towards the passenger. Given that the glove box is located proximate to a passenger traveling in the front seat of the vehicle, it would be desirable for the glove box to break the rearward load path that occurs in a front end collision.

As the glove box is often installed in the IP via a housing or the like, the glove box may become detached from the IP. It would likewise be desirable for the glove box to maintain the relationship between a passenger compartment door of the glove box and the rest of the instrument panel. In this way, rearward directed forces on the glove box would not displace the passenger compartment door towards the vehicle occupants. Since the glove box has an internal volume that resides within the IP, this internal volume can be used to accommodate rearward moving components and structure to prevent a similar rearward movement of the glove box and break the load path towards the passenger compartment.

SUMMARY OF THE INVENTION

A glove box having a tear seam disposed on an inner wall is provided. The inner wall is spaced apart from and generally parallel to the passenger compartment wall. The inner wall has a tear seam that tears to allow components and structure moving rearward towards the passenger compartment to enter the glove box and break the load path. For example, when the firewall of the vehicle is deformed rearwards, such as during a front end collision, the rearward movement of the HVAC tears the tear seam and allows portions of the HVAC to enter the glove box. In this way, the glove box, including the passenger compartment wall, are prevented from moving rearward towards the passenger compartment. This further breaks the load path that has built up between at least one of the engine, firewall, IP components and structure, and the glove box.

The glove box also has a frangible portion disposed on the inner wall. The frangible portion extends towards the interior of the IP and the firewall. In one example, the frangible portion extends from the inner wall towards a portion of the HVAC. The frangible portion fills the space between the glove box and the HVAC to enable the tear seam to tear faster. The frangible portion also concentrates the stress throughout the tear seam.

The glove box mounts to a housing within the IP. A window is disposed in a rear portion of the housing to receive the frangible portion from the inner wall of the glove box. The housing has a cross brace disposed along a bottom portion of the housing to secure the housing and the glove box to the IP. The cross brace reinforces the housing so that the window does not weaken the housing and allow the housing or the glove box to separate from the IP.

The glove box assembly including the housing allows rearward moving components and structure from within the IP to tear the tear seam on the inner wall and enter the glove box. This prevents the passenger compartment wall of the glove box from being displaced towards the passenger compartment and breaks the rearward moving load path that develops during a front impact. The frangible portion helps aid in the tearing of the tear seam by filling the space between the glove box and, for example, the HVAC while concentrating the force on the tear seam. The housing receives the glove box and has a cross brace to help secure the glove box and the housing to the IP. The housing further has a window to receive the frangible portion.

BRIEF DESCRIPTION OF THE DRAWINGS

FIG. 6 is a cross sectional side view depicting the tear seam formed from a notched groove.

DETAILED DESCRIPTION OF THE INVENTION

Figure 1:
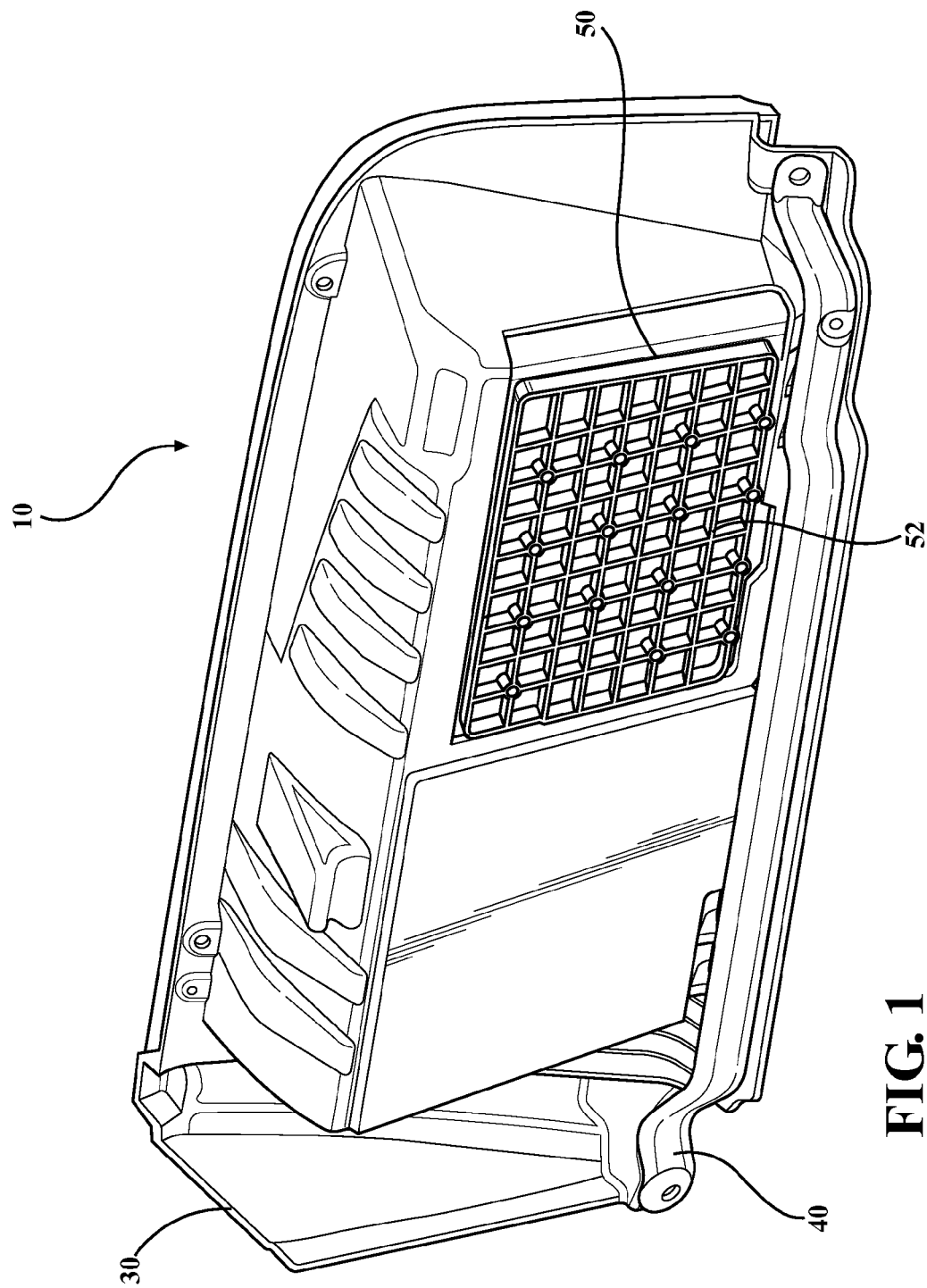
FIG. 1 is a perspective view a glove box assembly.
Figure 2:
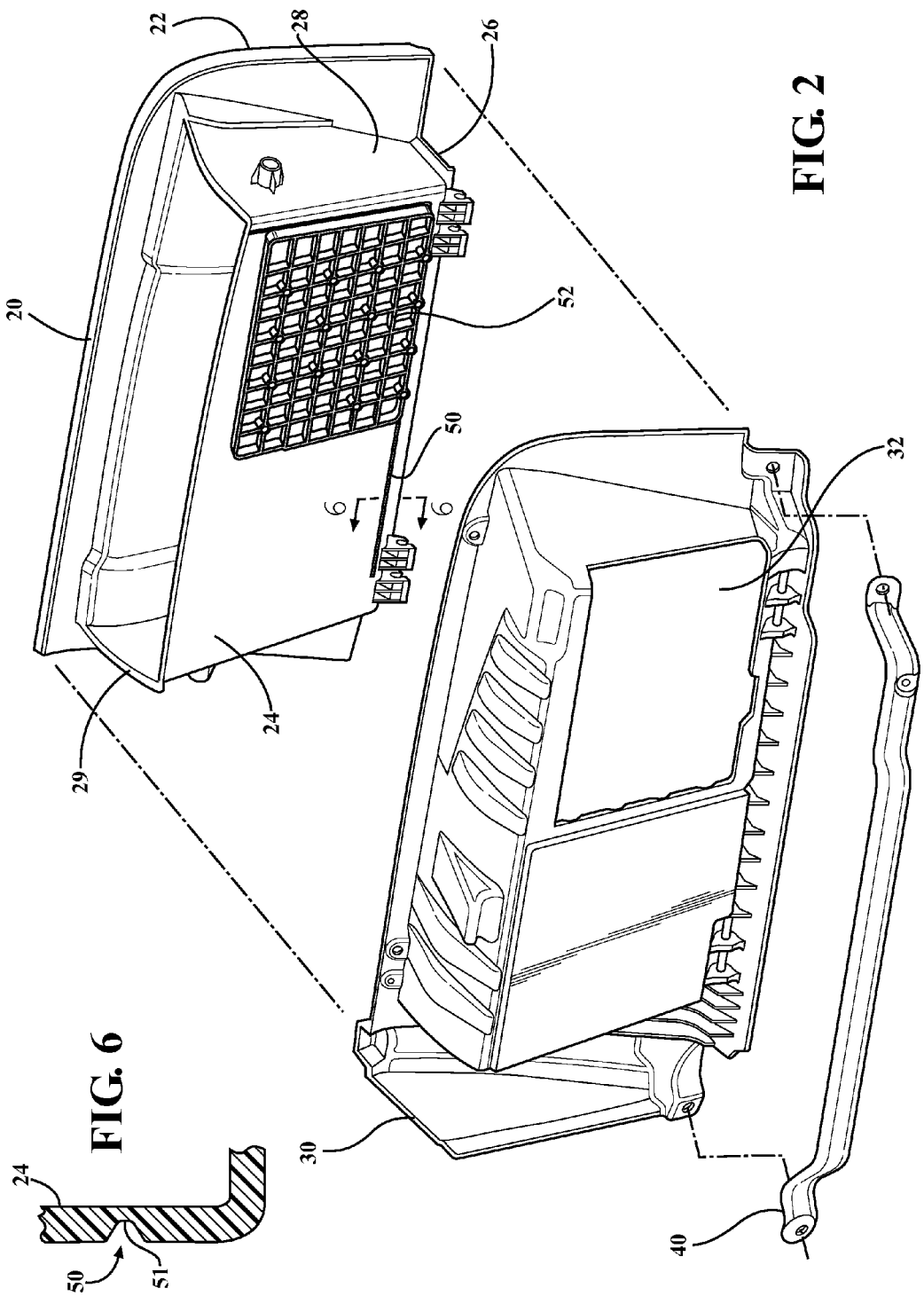
FIG. 2 is an exploded view of the glove box assembly shown in FIG. 1.

With first reference to FIGS. 1 and 2, a glove box assembly 10 is provided. The glove box assembly 10 includes a glove box 20, and housing 30, and a cross brace 40. The glove box 20 has a passenger compartment wall 22, an inner wall 24, a bottom wall 26, and a pair of spaced apart side walls 28, 29. The passenger compartment wall 22 faces the passenger compartment 90. The inner wall 24 faces the interior of the instrument panel (IP) 60 and the firewall 70 of the vehicle. The inner wall 24 is spaced apart from and generally parallel to the passenger compartment wall 22.

A tear seam 50 is disposed on the inner wall 24. A frangible portion 52 is further disposed on the inner wall 24 facing the interior of the IP 60 and the firewall 70. In a preferred embodiment, the tear seam 50 is disposed along a portion of the inner wall 24 proximate to the frangible portion 52. As shown in FIGS. 1 and 2, the tear seam 50 is disposed on the inner wall 24 about the frangible portion 52. Specifically, the tear seam 50 surrounds the entire frangible portion 52. In this arrangement, the frangible portion 52 distributes a rearward moving force throughout the tear seam 50 and encourages the tear seam 50 to tear throughout its entirety.

The glove box 20 is mounted to the housing 30 and the housing 30 is mounted to the IP 60. The housing 30 has a window 32 to receive the frangible portion 52 extending from the inner wall 24. The cross brace 40 is disposed along a bottom portion of the housing 30 to reinforce the housing 30. Without the cross brace 40, the window 32 could weaken the housing 30 such that the glove box 20 and/or the housing 30 could detach from the IP 60. The cross brace 40 secures the housing 30 and the glove box 20 to the IP 60.

Figure 3:
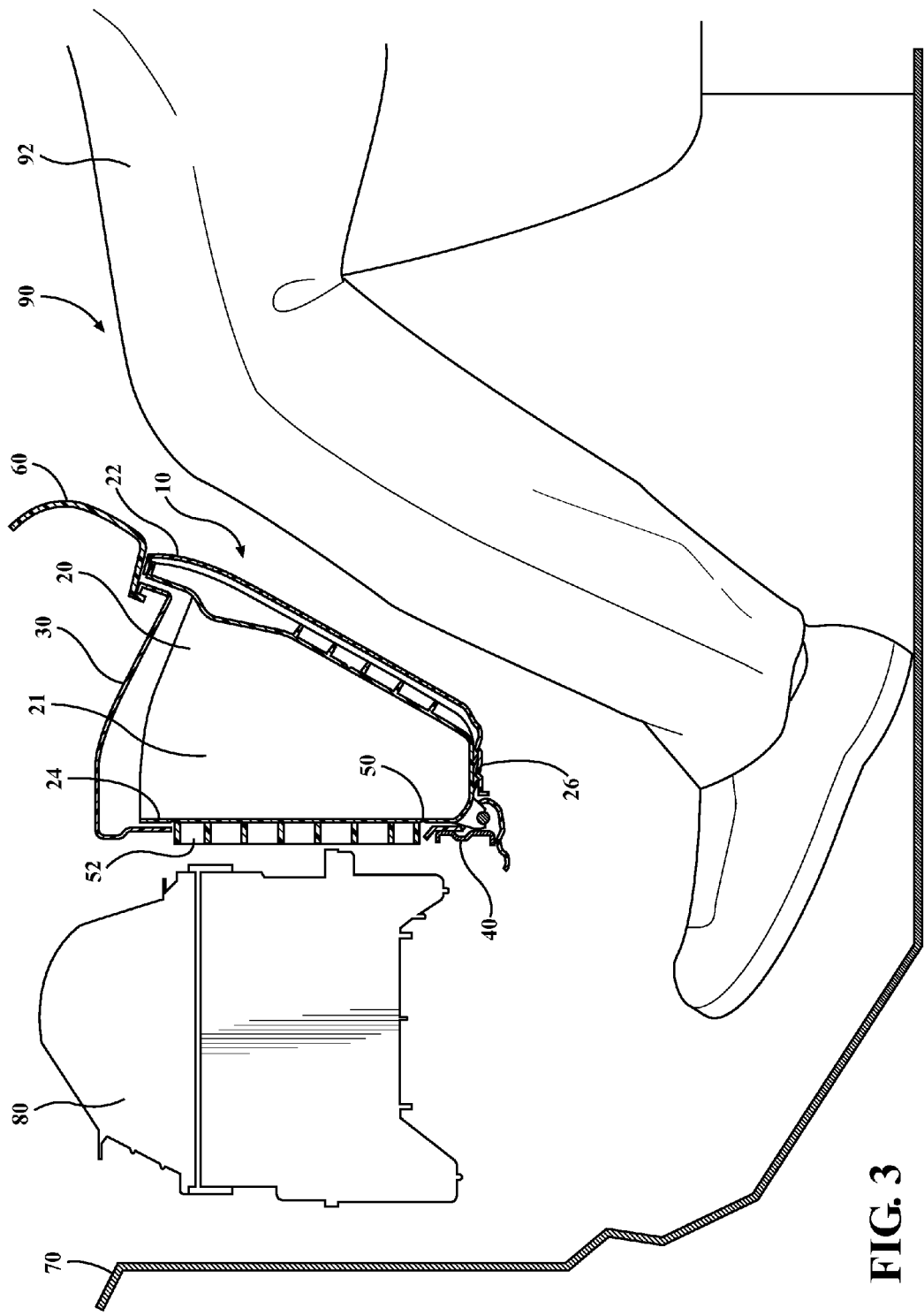
FIG. 3 is a cross sectional side view of the glove box assembly and an HVAC system within an IP of a vehicle.

The operation of the tear seam 50 and frangible portion 52 of the glove box 20 will now be described with reference to FIGS. 3-5. FIG. 3 is a cross sectional side view of the glove box assembly 10 mounted to an IP 60 of a vehicle. In an exemplary arrangement, a portion of the HVAC 80 resides between the glove box assembly 10 and the firewall 70. However, one skilled in the art will appreciate that any number of components and structures that commonly reside within the IP 60 between the passenger compartment 90 and the firewall 70 could be substituted for the HVAC 80. As such, the HVAC 80 is used merely as an illustrative example.

FIG. 3 depicts a normal arrangement between the HVAC 80 and the glove box assembly 10 before a collision. The passenger compartment wall 22 of the glove box 20 has not been displaced into the passenger compartment 90 and is in a normal relation with the IP 60. The frangible portion 52 extends from the inner wall 24 through the window 32 to fill the space between the HVAC 80 and the inner wall 24 and nearly contact the HVAC 80.

Figure 4:
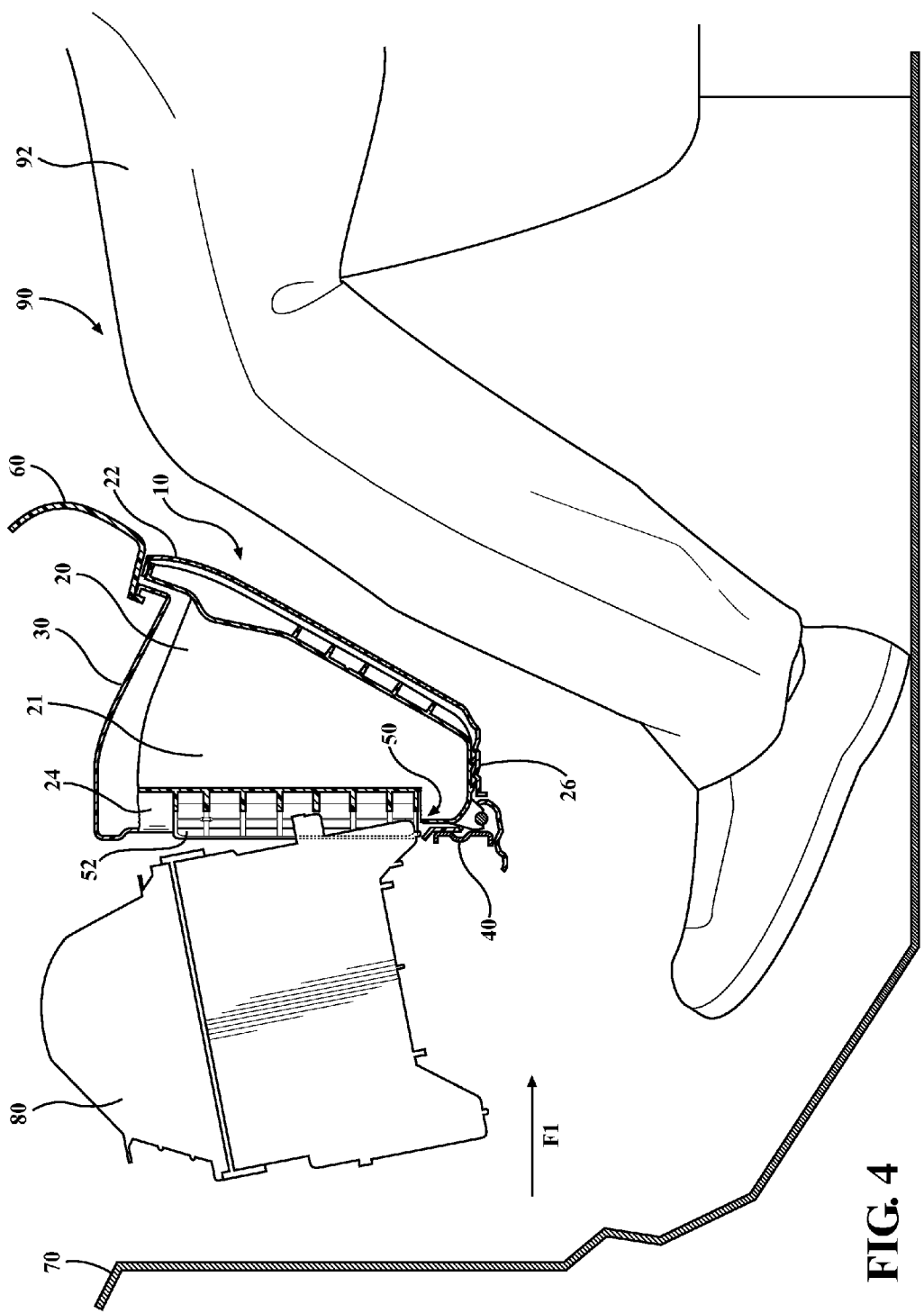
FIG. 4 is a cross sectional side view in which the HVAC system is moving rearward and impacting an inner wall of the glove box assembly.

In FIG. 4, a rearward force F1 displaces the HVAC 80 rearward towards the passenger compartment 90. As the frangible portion 52 was in close contact to the HVAC 80 through the window 32, the rearward displacement of the HVAC 80 is transferred to the tear seam 50 via the frangible portion 52. Accordingly, the tear seam 50 tears and allows a portion of the HVAC 80 to enter through the window 32 into an internal volume 21 of the glove box 20. Furthermore, the passenger compartment wall 22 of the glove box 20 maintains its relationship to the IP 60 shown in FIG. 3.

In a preferred embodiment, the tear seam 50 tears upon receiving a tear force which is greater than a predetermined tear seam threshold force. One skilled in the art will appreciate that the amount of tear force required to overcome the predetermined tear seam threshold force is a design preference. However, in a preferred embodiment the predetermined tear seam threshold force is set to be less than a housing breaking threshold such that the tear seam 50 tears before the cross brace 40 and housing 30 break away from the IP 60.

Figure 5:
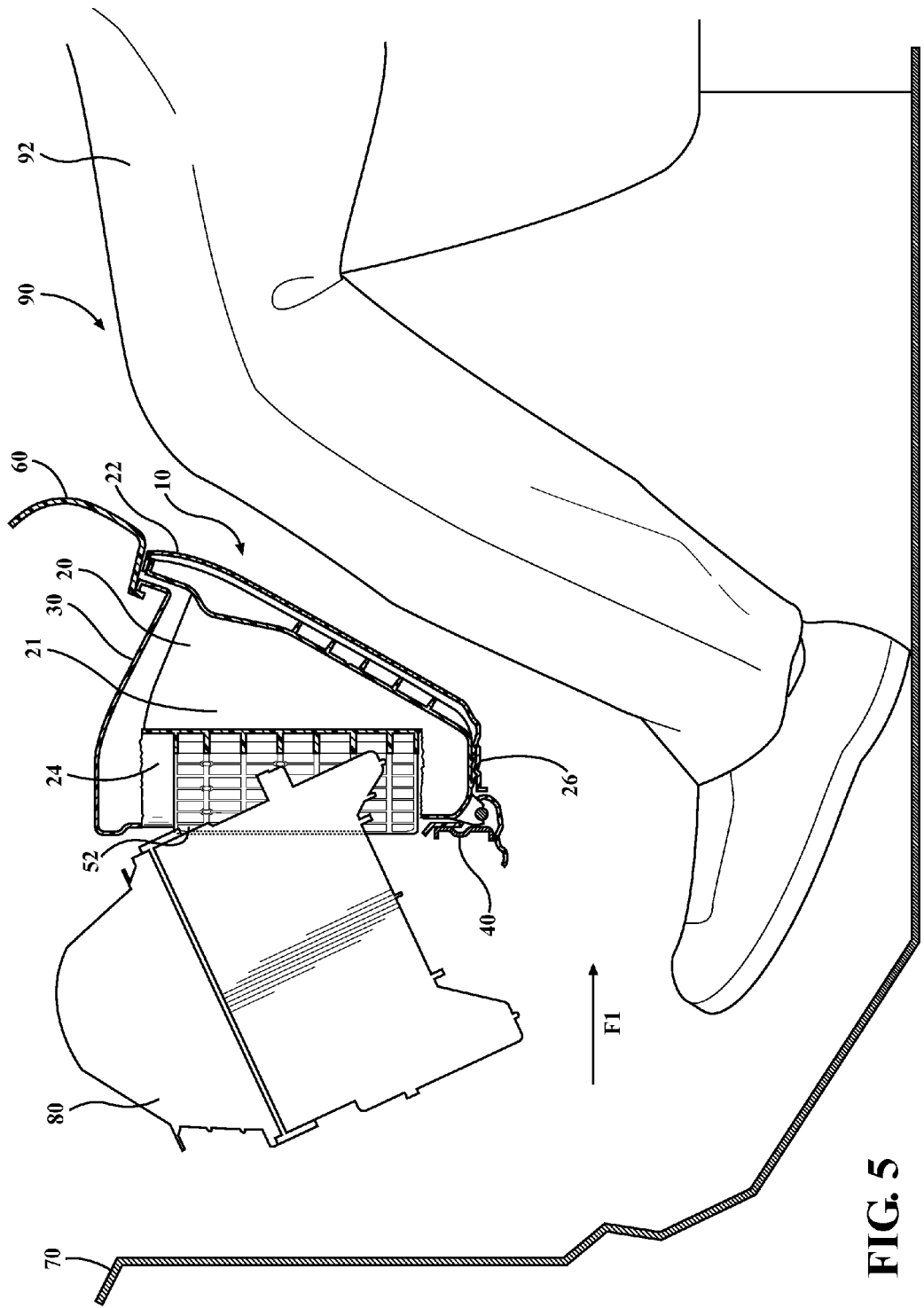
FIG. 5 is a cross sectional side view in which the HVAC system has torn a tear seam on the inner wall of the glove box assembly and entered an inner volume of the glove box assembly.

In FIG. 5, the rearward force F1 displaces the HVAC 80 fully rearward through the window 32 into the internal volume 21 of the glove box 20. The frangible portion 52 has concentrated the rearward force F1 throughout the entirety of the tear seam 50 to create an opening to receive the HVAC 80. In this way, the rearward load path of the HVAC 80 towards a passenger 92 in the passenger compartment 90 is broken. The passenger compartment wall 22 is also held in a fixed relationship to the IP 60 to prevent the glove box 20 from impacting the passenger 92.

One skilled in the art will appreciate that the size, shape, and location of the window 32, tear seam 50, and frangible portion 52 are design choices and can be modified to better accommodate various components and structures within the IP 60. As such, the window 32, tear seam 50, and frangible portion 52 depicted in the Figures are merely illustrative of a preferred embodiment of the present invention.

FIG. 6 shows an exemplary cross sectional side view of the tear seam 50. In a preferred embodiment, the tear seam 50 is formed from a notched groove 51 disposed on the inner wall 24. In this way, the notched groove 51 weakens the inner wall 24 about the tear seam 50 so that the inner wall 24 tears along the tear seam 50.

The predetermined tear seam threshold force is controlled in part by the properties of the notched groove 51. As such, one skilled in the art will appreciate that the tear properties of the tear seam can be adjusted by modifying the notched groove 51 to remove more material from the inner wall 24 or by changing the shape of the notched groove 51. It is further appreciated that the tear seam 50 can be realized by other structures in the inner wall 24 including perforations, cutting, etching, etc., without departing from the spirit of the invention The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein.

We claim:

1. A glove box assembly for an instrument panel of a vehicle, the vehicle having an HVAC, the glove box assembly comprising:
 a glove box having a first inner wall, the first inner wall having a tear seam;
 a housing adapted to contain the glove box, the housing having a second inner wall positioned between the first inner wall and the HVAC, the second inner wall having a window thereby allowing the HVAC to contact the first inner wall of the glove box through the window in the event of a collision, the HVAC is displaced rearward through the window and into an internal volume of the glove box after the tear seam is broken.

2. The glove box assembly of claim 1, further comprising:
 a frangible portion disposed on the first inner wall.

3. The glove box assembly of claim 2, wherein the frangible portion is configured to break upon receiving a break force greater than a predetermined frangible portion threshold force.

4. The glove box assembly of claim 2, wherein the window receives the frangible portion.

5. The glove box assembly of claim 1, wherein the tear seam is disposed on a portion of a peripheral edge of the first inner wall.

6. The glove box assembly of claim 1, wherein the tear seam configured to tear upon receiving a tear force greater than a predetermined tear seam threshold force.

7. The glove box assembly of claim 1, wherein the compartment is moveable between an open position and a closed position.

8. The glove box assembly of claim 1, further comprising:
 a cross brace disposed on the housing, the cross brace securing the glove box to the instrument panel.

9. The glove box assembly of claim 8, wherein the cross brace is disposed along a bottom portion of the housing.

10. The glove box assembly of claim 1, wherein the tear seam is a notched groove in the first inner wall.

* * * * *